United States Patent
Niu

(10) Patent No.: US 7,925,101 B2
(45) Date of Patent: Apr. 12, 2011

(54) APPARATUS FOR CONTROLLING IMAGE COMPRESSION

(75) Inventor: Sheng-Chun Niu, Sinshih Township, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 888 days.

(21) Appl. No.: 11/850,449

(22) Filed: Sep. 5, 2007

(65) Prior Publication Data

US 2009/0060355 A1   Mar. 5, 2009

(51) Int. Cl.
    *G06K 9/36*   (2006.01)
(52) U.S. Cl. ...................................................... 382/232
(58) Field of Classification Search .................. 382/232, 382/233, 235, 236, 251, 239, 248; 358/1.2, 358/1.15, 426.04; 375/240.01, 240.03, 240.05, 375/240.12, 240.16, 240.25, 240.26
    See application file for complete search history.

(56) References Cited

U.S. PATENT DOCUMENTS

| 6,915,018 | B2 * | 7/2005 | Tajime ........................... 382/251 |
| 7,512,181 | B2 * | 3/2009 | Boice et al. ............... 375/240.26 |
| 2003/0095594 | A1 * | 5/2003 | Laksono et al. .......... 375/240.03 |
| 2006/0062292 | A1 * | 3/2006 | Boice et al. ............... 375/240.01 |
| 2006/0251330 | A1 * | 11/2006 | Toth et al. ...................... 382/236 |

* cited by examiner

*Primary Examiner* — Duy M Dang
(74) *Attorney, Agent, or Firm* — Stout, Uxa, Buyan & Mullins, LLP

(57) ABSTRACT

A method and apparatus for controlling image compression is disclosed. A current block of pixels is firstly compressed. The average pixel size of the compressed current block is averaged with an average pixel size of preceding block or blocks to obtain an average value. The compressed current block is passed as output, if the average value is not greater than a target value; otherwise a portion of the current block prior to compression is truncated and then passed as the output.

7 Claims, 3 Drawing Sheets

APPARATUS FOR CONTROLLING IMAGE COMPRESSION

BACKGROUND OF THE INVENTION

1. Field of the Invention

The present invention generally relates to image compression, and more particularly to a method and apparatus for dynamically controlling pixel size in image compression.

2. Description of the Prior Art

Image compression is frequently used to reduce data size of a digital image, to facilitate other image process, image storage or image transport. In the image transport, for example, pixel size of the compressed image should not exceed system bandwidth with which the compressed image can be reliably transported; otherwise the buffer of the encoder/transmitter or the decoder/receiver would result in overflow, a situation that system designers keenly want to prevent from occurring.

It is recognized that no single compression/coding scheme is universally suitable for all kinds of image and systems. For the worse, a compression/coding scheme will usually uncontrollably expand instead of reducing the size of an image of certain types.

For the foregoing reasons, a need has arisen to propose a method and apparatus that could controllably and dynamically govern the image compression/coding, to prevent the occurrence of buffer overflow and catastrophic data expanding.

SUMMARY OF THE INVENTION

In view of the foregoing, it is an object of the present invention to provide a compression/coding method and apparatus that could controllably and dynamically govern the image compression/coding, to prevent the occurrence of buffer overflow and catastrophic data expanding.

According to the object, the present invention provides a method for controlling image compression. A current block of pixels is firstly compressed. The average pixel size of the compressed current block is averaged with an average pixel size of preceding block or blocks to obtain an average value. The compressed current block is passed as output, if the average value is not greater than a target value; otherwise a portion of the current block prior to compression is truncated and then passed as the output.

According to another embodiment, the present invention provides apparatus for controlling image compression. A compressor compresses a current block of pixels. A compression controller averages the average pixel size of the compressed current block with an average pixel size of preceding block or blocks to obtain an average value. Subsequently, the compression controller passes the compressed current block as output, if the average value is not greater than a target value. Otherwise, a truncator truncates a portion of the current block prior to compression, and passes the truncated current block as the output under control of the compression controller.

DETAILED DESCRIPTION OF THE INVENTION

Figure 1A:
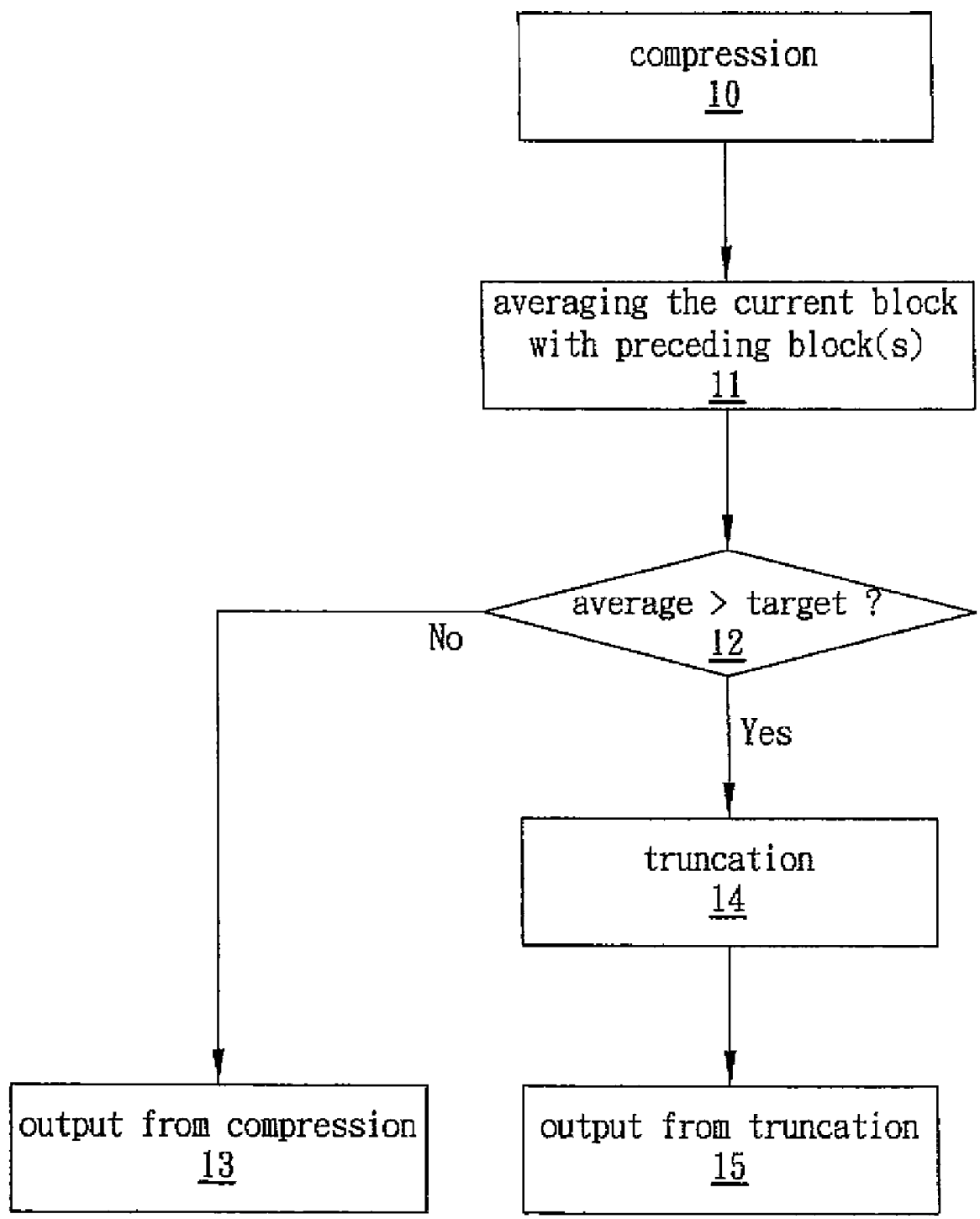
FIG. 1A illustrates a flow diagram of image compression method according to one embodiment of the present invention.
Figure 1B:
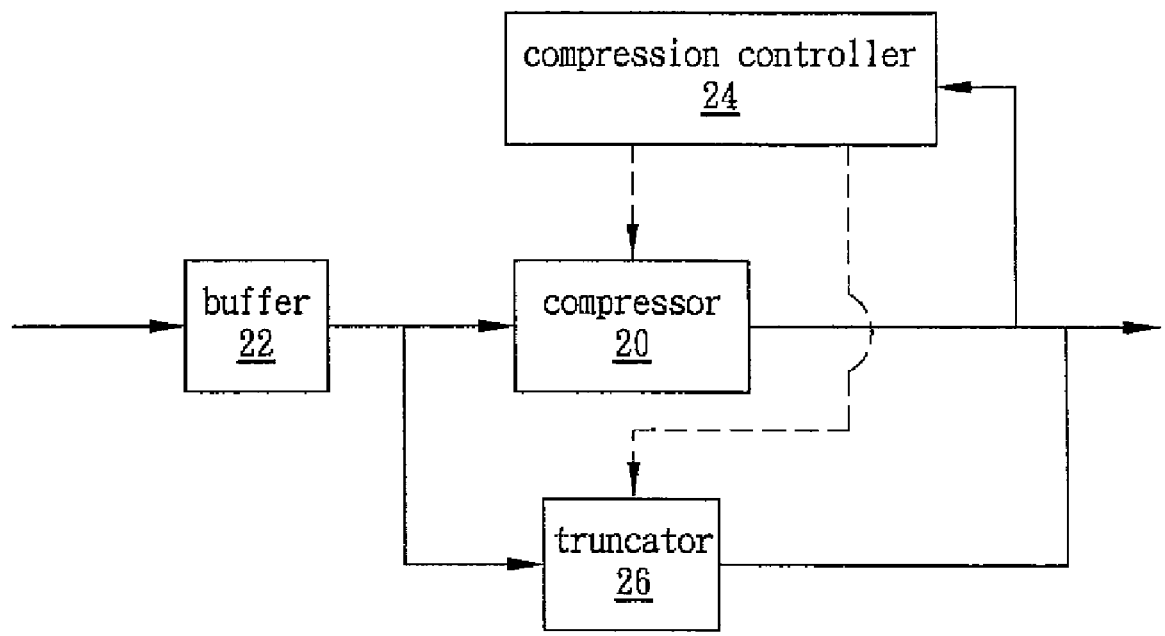
FIG. 1B illustrates a block diagram of corresponding image compression apparatus according to the embodiment.
Figure 1C:
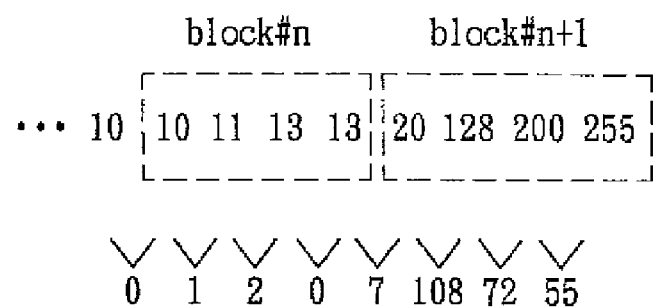
FIG. 1C shows an example of image pixels under compression according to the present embodiment with respect to FIGS. 1A-1B.

FIG. 1A illustrates a flow diagram of image compression method according to one embodiment of the present invention, and FIG. 1B illustrates a block diagram of corresponding image compression apparatus according to the embodiment. FIG. 1C shows an example of image pixels under compression according to the present embodiment with respect to FIGS. 1A-1B. For purpose of demonstration and brevity, only a partial line of a frame is illustrated here.

At the outset of compression, the pixels of FIG. 1C are grouped into blocks as indicated with dotted lines. In this exemplary embodiment, four neighboring pixels are grouped as a block. For example, neighboring pixels 10, 11, 13, 13 constitute a block #n, and following pixels 20, 128, 200, 255 constitute another block #n+1. It is appreciated by those skilled in the art that the number of pixels in a block is not limited to four as in this example, and may be fixed or varied.

The blocks are then subjected to compression or encoding (step 10) in sequence by a compressor 20. It is noted that the terms "compression" and "encoding/coding" are interchangeably used in this disclosure. In the embodiment, the current block #n temporarily stored in a buffer 22 is firstly subjected to compression. For the purpose of illustration, a differential pulse code modulation (DPCM) is used for image compression with the assumption that neighboring pixels have similar brightness, while other coding or compression technique could be well utilized instead. In the DPCM, a preceding pixel's brightness is subtracted from a succeeding pixel's brightness. The results are shown in FIG. 1C and the second column of Table I.

TABLE I

| original | DPCM | Entropy coding | Pixel size (bits/pixel) |
|---|---|---|---|
| 10 | 10 − 10 = 0 | 0 | 1 × 3 = 3 |
| 11 | 11 − 10 = 1 | 100 | 3 × 3 = 9 |
| 13 | 13 − 11 = 2 | 1101 | 4 × 3 = 12 |
| 13 | 13 − 13 = 0 | 0 | 1 × 3 = 3 |
| Total = 24 × 4 = 96 | | | Total = 27 |
| Average = 96/4 = 24 | | | Average = 27/4 = 6.7 |

In the embodiment, the DPCM results are further, but not necessarily, subjected to another compression-entropy coding, such as Huffman coding. In the entropy coding, the brightness difference (of DPCM) that occurs more frequently are assigned shorter codes, and the brightness difference that occurs less frequently are assigned longer codes. The results are thus variable-length codes as shown in the third column of Table I, with the pixel size (bits/pixel) shown in the fourth column of Table I. It is noted that the number of bits in each entropy code is multiplied by three (3) for the reason that a pixel is displayed, for example, as a composite result of red (R) color, green (G) color and blue (B) color in the RGB color space. As seen from the sixth row of Table I, the four original pixels are compressed from 96 bits (or average pixel size of 24 bit/pixel) to 27 bits (or average pixel size of 6.7 bits/pixel). In other words, the compression reaches a compression rate of 3.5.

Subsequently, an average value is obtained by averaging the average pixel size of the compressed current block #n with the average pixel size of preceding block or blocks that have been either compressed or truncation coded (step 11). It is appreciated by those skilled in the art that the number of preceding blocks to be averaged may be one or more than one. In the embodiment, a compression controller 24 operates to perform the averaging according to the output of the compressor 20 and a stored preceding average pixel size. In this example, assume the average pixel size of preceding blocks is 11.3 bits/pixel, and therefore the average value is 9 (=(11.3+6.7)/2) bits/pixel.

The average pixel size is then compared to a target value (step 12) with which a system bandwidth can accommodate and ensure that an encoder or a decoder buffer does not overflow. If the average value is not greater than the target value, the compression controller 24 activates the compressor 20 (and inactivates a truncator 26) such that the output from the compressor 20 is allowed to pass (step 13). On the other hand, if the average value is greater than the target value, the compression controller 24 then (inactivates the compressor 20 and) activates truncator 26 to perform truncation coding (step 14) on the original pixels of the current block such that the output from the truncator 26 is allowed to pass (step 15). The truncation coding on the block is discussed below accompanying the exemplary block #n+1. For the current block #n, the average value (i.e., 9) is not greater than the target value (i.e., 12), and therefore the output from the compressor 20 is allowed to pass (step 13).

The block #n+1 currently stored in the buffer 22 is now subjected to compression, i.e., DPCM and entropy coding. The results from DPCM are shown in FIG. 1C and the second column of Table II, and the results from entropy coding are shown in the third column, with the pixel size (bits/pixel) shown in the fourth column of Table II.

TABLE II

| original | DPCM | Entropy coding | Pixel size (bits/pixel) |
|---|---|---|---|
| 20 | 20 − 13 = 7 | 0111 | 4 × 3 = 12 |
| 128 | 128 − 20 = 108 | 11110 | 5 × 3 = 15 |
| 200 | 200 − 128 = 72 | 101100 | 6 × 3 = 18 |
| 255 | 255 − 200 = 55 | 111110 | 6 × 3 = 18 |
| Total = 24 × 4 = 96 | | | Total = 63 |
| Average = 96/4 = 24 | | | Average = 63/4 = 15.7 |

As seen from the sixth row of Table II, the four original pixels are compressed from 96 bits (or average pixel size of 24 bit/pixel) to 63 bits (or average pixel size of 15.7 bits/pixel).

Subsequently, an average value is obtained by averaging the average pixel size of the compressed current block #n+1 with the average pixel size of preceding block or blocks that have been either compressed or truncation coded (step 11). In this example, as the average pixel size of preceding blocks is 9 bits/pixel, the average value is thus 12.3 (=(9+15.7)/2) bits/pixel.

The average value is then compared to a target value (step 12) with which a system bandwidth can accommodate and ensure that an encoder or a decoder buffer does not overflow. In this example, the average value (i.e., 12.3) is greater than the target value (i.e. 12), and the compression controller 24 therefore (inactivates the compressor 20 and) activates truncator 26 to perform truncation coding (step 14) on the original (uncompressed) pixels of the current block #n+1 such that the output from the truncator 26 is allowed to pass (step 15). According to the present embodiment, the least significant bit or bits (LSB) of the pixel brightness are truncated, such that the average pixel size is no longer greater than the target value (12 bits/pixel) with which a system bandwidth can accommodate. For example, four least significant bits (LSB) of the pixel brightness for each color are truncated, as shown in second column (before truncation) and the third column (after truncation) of Table III. The average pixel size of the current block #n+1 after truncation coding becomes 12 bits/pixel. This average pixel size (i.e., 12) is averaged with the average pixel size (i.e., 9) of preceding blocks up to the block #n, and the average pixel size of preceding blocks up to the block #n+1 is updated as 10.5 (=(9+12)/2) bits/pixel.

TABLE III

| Original (in decimal) | Before truncation (in binary) | after truncation (in binary) |
|---|---|---|
| 20 | 00010100 | 0001 |
| 128 | 10000000 | 1000 |
| 200 | 11001000 | 1100 |
| 255 | 11111111 | 1111 |

For the block #n+1, the truncated results in Table III are allowed to pass (step 15) by the compression controller 24 as output, in lieu of the results of entropy coding in Table II.

Figure 2A:
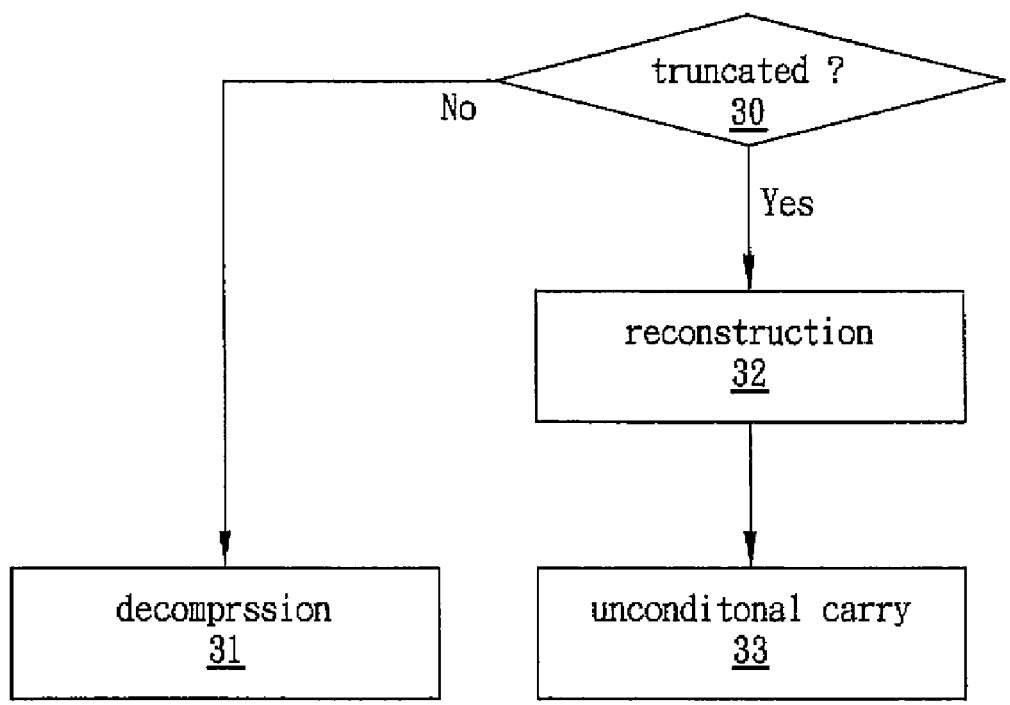
FIG. 2A illustrates a flow diagram of associated image decompression method according to the embodiment of the present invention.
Figure 2B:
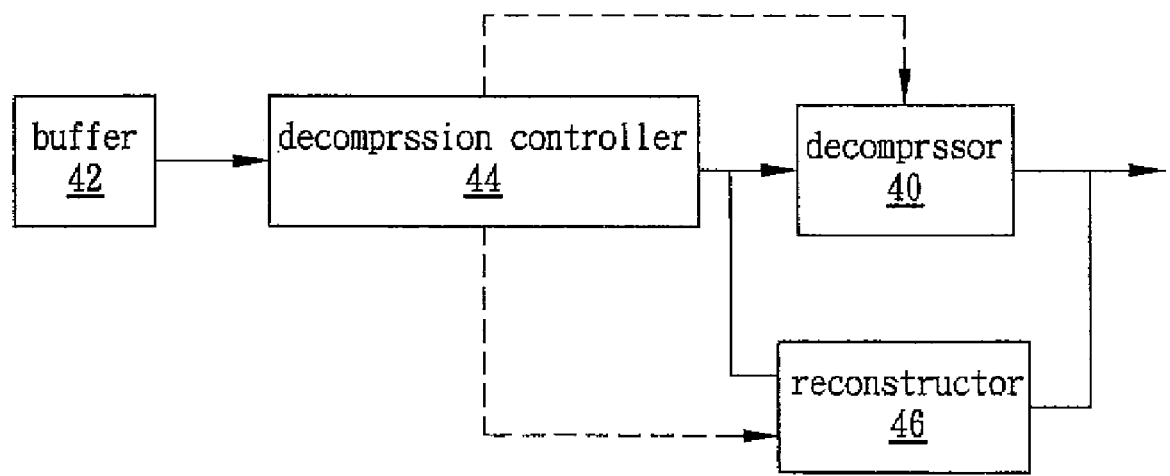
FIG. 2B illustrates a block diagram of associated image decompression apparatus according to the embodiment.

FIG. 2A illustrates a flow diagram of associated image decompression method according to the embodiment of the present invention, and FIG. 2B illustrates a block diagram of associated image decompression apparatus according to the embodiment.

At the outset of the decompression, a decompression controller 44 determines whether the pixels temporarily stored in a buffer 42 have ever been truncated (step 30). The determination of truncation is usually performed by, but not limited to, examining header transported from a compressor/encoder. If the determination is negative, the pixels are subjected to a decompression or decompressions (step 31) of a decompressor 40 that are the inverse operation(s) of the compressor 20. On the other hand, if the determination of step 30 is affirmative, the pixels are subjected to reconstruction (step 32) by a reconstructor 46 such that the truncated LSB(s) are reconstructed, for example, by inserting bit(s) "0" or "1," at the locations of the truncated LSB(s). For the example discussed above, each truncated pixel of the block #n+1 is reconstructed by inserting bits "0" at [3:0], as shown in the third column of Table IV.

TABLE IV

| Original (in decimal) | Truncated | Reconstructed | Unconditional carry |
|---|---|---|---|
| 20 | 0001 | 00010000 | 00011000 |
| 128 | 1000 | 10000000 | 10001000 |
| 200 | 1100 | 11000000 | 11001000 |
| 255 | 1111 | 11110000 | 11111000 |

In the present embodiment, a further step 33—unconditional mathematical carry is performed, such that the most significant bit of the inserted LSB(s) is replaced with a carry "1". In this example, the most significant bit of the four inserted LSBs (or the fourth bit from the right hand of the reconstructed pixel) is replaced with a carry "1". This operation is performed in order to make up the loss during the lossy truncation coding.

According to the embodiment illustrated above, the present invention could be utilized to controllably govern the compression/coding by dynamically selecting an appropriate compression/coding scheme such that the pixel size of the compressed image would not exceed system bandwidth, therefore preventing the occurrence of buffer overflow. In short, the compressor/decompressor or encoder/decoder according to the present invention can operate at possibly full speed without overflow.

Although specific embodiments have been illustrated and described, it will be appreciated by those skilled in the art that various modifications may be made without departing from the scope of the present invention, which is intended to be limited solely by the appended claims.

What is claimed is:

1. Apparatus for controlling image compression, comprising:
   a buffer for temporarily storing a current block including a plurality of pixels;
   a compressor for compressing the current block;
   a compression controller obtaining an average value of an average pixel size of the compressed current block and an average pixel size of preceding compressed or truncated block or blocks, and passing the compressed current block as output, if the average value is not greater than a target value; and
   a truncator for truncating a portion of the uncompressed current block if the average value is greater than the target value, the truncated uncompressed current block being then passed as the output under control of the compression controller.

2. The apparatus according to claim 1, wherein the target value is a pixel size with which a bandwidth of the image compression could accommodate and ensure that no overflow occurs.

3. The apparatus according to claim 1, wherein the truncator truncates least significant bit or bits of the uncompressed current block, such that the truncated uncompressed current block has an average pixel size no greater than the target value.

4. The apparatus according to claim 3, further comprising:
   a decompression controller for determining whether transported compressed or truncated current block has been truncated.

5. The apparatus according to claim 4, further comprising:
   a decompressor for decompressing the transported block if the transported block is determined as not been truncated; and
   a reconstructor for reconstructing the transported block if the transported block is determined as been truncated.

6. The apparatus according to claim 5, wherein the reconstructor reconstructs the transported block by inserting bit or bits at location of the truncated bit or bits.

7. The apparatus according to claim 6, wherein the reconstructor replaces most significant bit of the inserted bit or bits with a carry bit.

* * * * *